United States Patent [19]

Taylor

[11] 4,064,977

[45] Dec. 27, 1977

[54] FLUID AMPLIFIED SHOCK ABSORBER HAVING DELAVAL NOZZLE

[75] Inventor: Douglas P. Taylor, Grand Island, N.Y.

[73] Assignee: Tayco Development, Inc., North Tonawanda, N.Y.

[21] Appl. No.: 790,439

[22] Filed: Apr. 25, 1977

Related U.S. Application Data

[63] Continuation of Ser. No. 616,800, Sept. 25, 1975, abandoned, which is a continuation of Ser. No. 520,939, Nov. 4, 1974, abandoned, which is a continuation of Ser. No. 399,165, Sept. 20, 1973, abandoned, which is a continuation of Ser. No. 225,570, Feb. 11, 1972, abandoned.

[51] Int. Cl.² ............................ F16F 9/19; F16F 9/34
[52] U.S. Cl. ............................... 188/317; 188/268; 188/306; 267/65 R
[58] Field of Search ............... 188/306, 308, 317, 316, 188/282, 268, 289; 239/101, 102, 265.19, 265.43; 267/64 R, 65 R

[56] References Cited

U.S. PATENT DOCUMENTS

| 1,719,308 | 7/1929 | Pospeshil | 188/317 X |
| 2,714,429 | 8/1955 | Etherton | 188/317 X |

FOREIGN PATENT DOCUMENTS

| 1,068,179 | 5/1967 | United Kingdom | 267/64 R |

*Primary Examiner*—George E. A. Halvosa
*Attorney, Agent, or Firm*—James P. Hume; Gary M. Ropski

[57] ABSTRACT

A simplified but highly efficient fluid-amplified liquid spring shock absorber is provided by incorporating a plurality of DeLaval nozzles in the piston head or dashpot head of a shock absorber.

6 Claims, 11 Drawing Figures

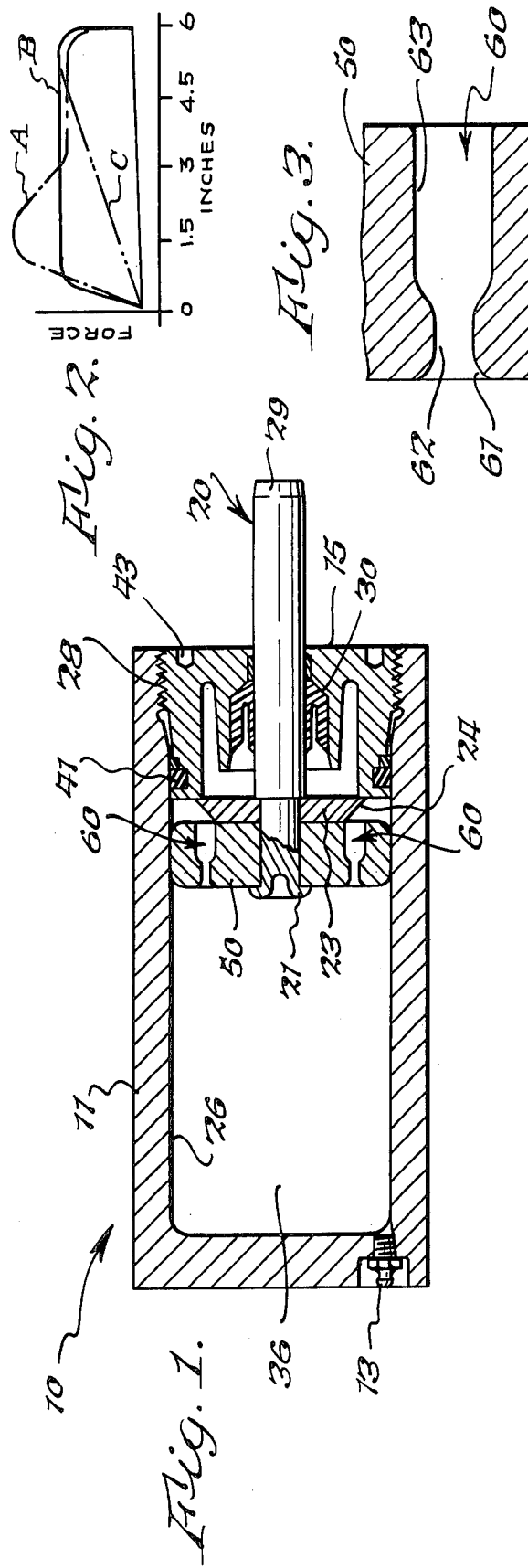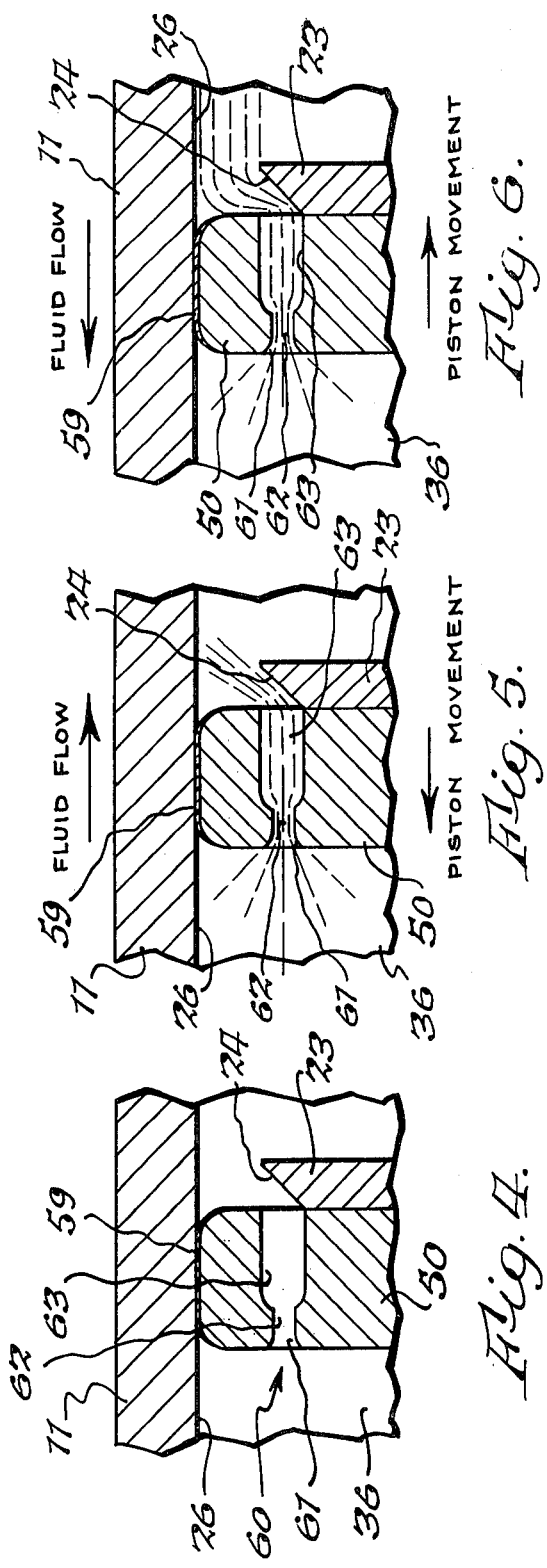

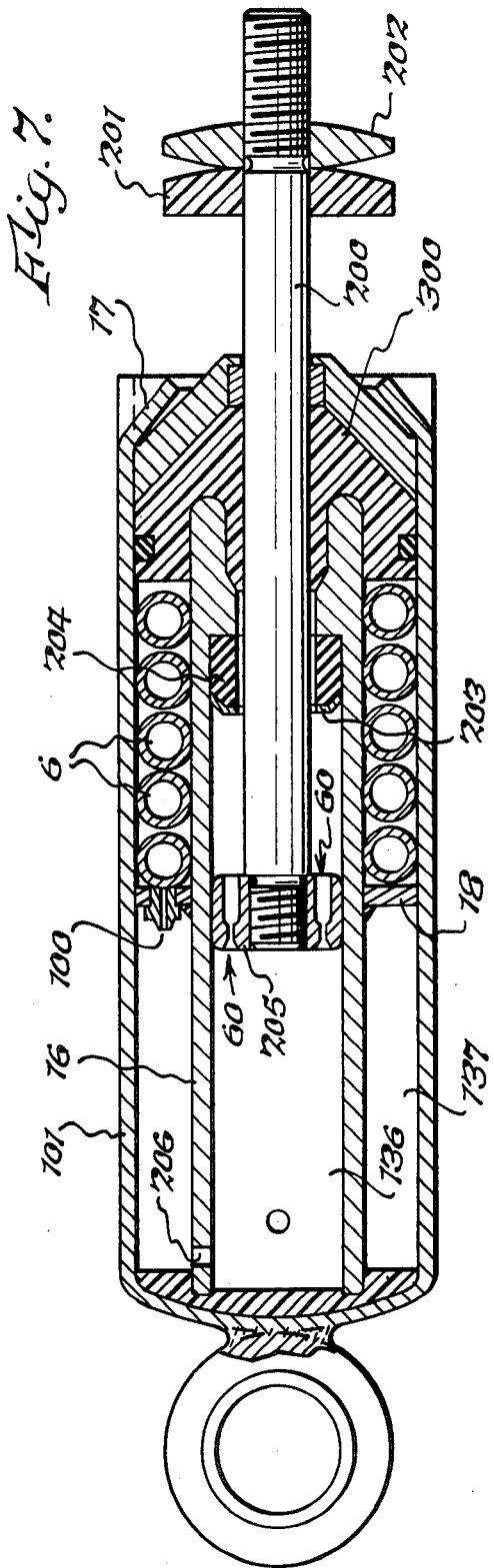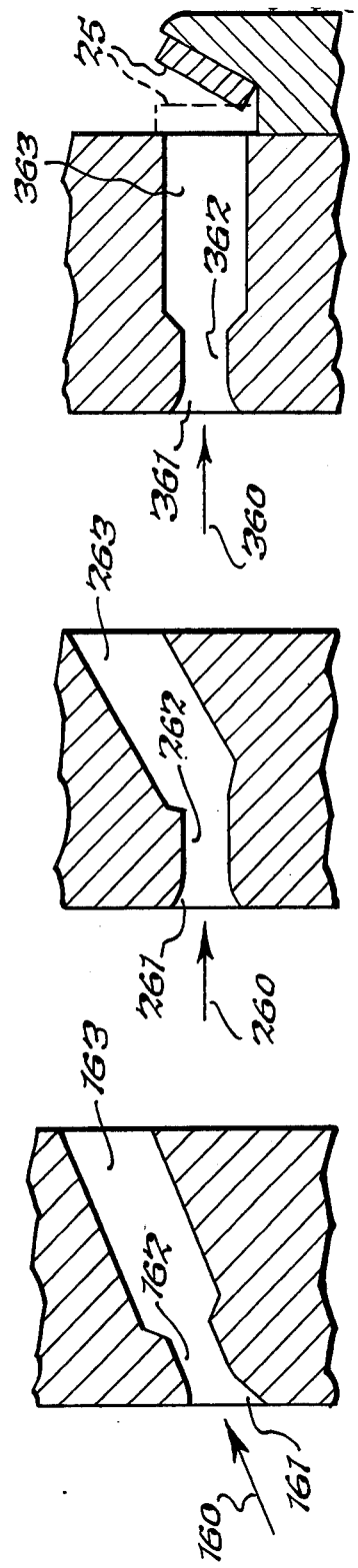

FLUID AMPLIFIED SHOCK ABSORBER HAVING DELAVAL NOZZLE

This is a continuation of application Ser. No. 616,800, filed Sept. 25, 1975, now abandoned, which is in turn a continuation of application Ser. No. 520,939, filed Nov. 4, 1974, now abandoned, which is in turn a continuation of application Ser. No. 399,165, filed Sept. 20, 1973, now abandoned, which is in turn a continuation of application Ser. No. 225,570, filed Feb. 11, 1972, now abandoned.

BACKGROUND OF THE INVENTION

This invention generally relates to shock absorbers and more particularly relates to liquid spring shock absorbers which can accomplish variations in shock mitigation through fluid amplification yielding vastly improved absorption ranges for high speed vehicle shock absorption.

A number of conventional shock absorbers which employ metering pins, metering holes, metering grooves or pressure responsive valves for shock mitigation are known in the art. Besides being expensive such shock absorbers are typically unable to operate at high efficiency during abnormal operating conditions. It has been observed, for example, than even advanced shock absorber designs often function erratically in suspension systems that are subjected to vehicle speeds in excess of 170 miles per hour.

In liquid spring shock absorbers, such erratic performance characteristics occur as a result of turbulent fluid flow conditions within the shock absorber. To obviate this problem and at the same time provide a liquid spring shock absorber capable of producing highly efficient shock curves without the necessity for metering pins, metering grooves and the like, it is desirable to provide a shock absorber which can operate efficiently at both subsonic and supersonic internal fluid flow conditions.

SUMMARY OF THE INVENTION

In accordance with this invention a new and improved liquid spring shock absorber is provided by utilizing a piston head vane or dashpot head characterized by having a plurality of DeLaval nozzle-shaped fluid passage clearances formed in the sweeping surface of the head of vane so that fluid contained in the shock absorber can pass between opposite ends of the head or vane at subsonic and supersonic flow rates without incurring turbulent flow.

Accordingly, the shock absorber of this invention can provide high performance characteristics for a wide range of vehicle velocities. In addition, larger shock absorber heads can be used in this invention, thereby eliminating the need for inner shock tubes. Other advantages of this invention include: (1) a shock absorber capable of operating at internal fluid velocities above and below the speed of sound, (2) utilization of low velocity orifice flow resistance to improve small bump shock characteristics in a vehicle suspension system without impairing shock absorption capability at high vehicle velocities, (3) improved rate of wheel return, (4) shock mitigation at a greater veloctiy spread than existing shock absorbers, (5) reduction in energy losses in a vehicle suspension by utilizing a liquid spring shock absorber in which high impedances in a dual flow orifice at low velocites causes the retention of some spring energy for initial acceleration of a vehicle wheel at the apex of its travel, (6) elimination of over pressure peaking which occurs in shock absorbers using pressure responsive valves, (7) a reduction in the number of communicating orifices required for fluid amplification, (8) shock absorber in which full bearing can be obtained on the piston or dashpot head for guidance and side load tolerances, (9) ease of orifice calibration, and (10) a shock absorber capable of using gas as well as liquids.

BRIEF DESCRIPTION OF THE DRAWINGS

The invention will be more readily understood by reference to the following drawings in which:

FIG. 1 is a longitudinal view in section of one form of the liquid spring shock absorber of this invention.

FIG. 2 is a graphic illustration comparing shock absorber characteristics of a straight orifice shock absorber, a spring type shock absorber and the unique shock absorber of this invention.

FIG. 3 is an enlarged sectional view of the DeLaval nozzle-shaped fluid passages used in the invention.

FIG. 4 is an enlarged sectional of a shock absorber of this invention illustrating the relative positions of the piston head nozzle, deflection plate and cylinder wall.

FIG. 5 is an enlarged sectional view illustrating the fluid flow action upon compression of the shock absorber of this invention.

FIG. 6 is a similar view showing fluid flow characteristics upon shock absorber extension.

FIG. 7 is longitudinal view in section of typical shock absorber of this invention employing DeLaval fluid amplification.

FIG. 8 is an enlarged sectional view of another DeLaval nozzle arrangement which eliminates the need for a deflection plate.

FIG. 9 illustrates another form of DeLaval nozzle arrangement which can be used in the practice of this invention.

FIG. 10 is an enlarged sectional view of a piston head having the combination of a deflector plate and a plate valve for fluid amplification.

DETAILED DESCRIPTION OF EMBODIMENTS

Figure 11:
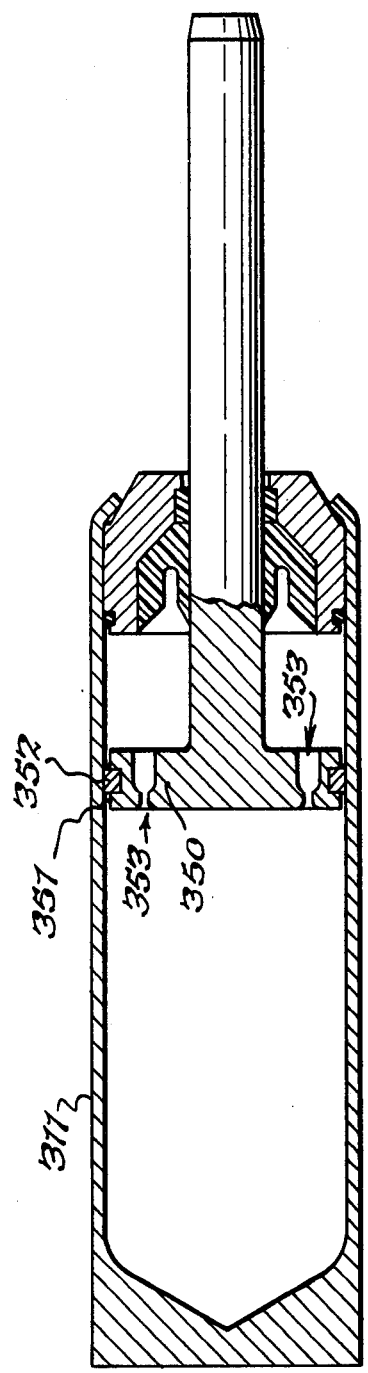
FIG. 11 is a longitudinal view of a shock absorber of this invention which employs a piston ring to reduce inefficiencies from external flow.

One embodiment of the improved liquid spring shock absorber of this invention is illustrated in FIG. 1. There a rod type shock absorber 10 is shown having an outer housing 11 which encloses a reciprocating piston assembly 20. End cap 15 is provided to close one end of housing 11 and is threadably engaged at 28 to the inner wall of the housing. Seal gland assembly 30 provides fluid-tight engagement between piston rod 20 and end cap 15. Static seal 41, in turn, provides fluid-tight engagement between end cap 15 and inner wall 26 of housing 11. Filler plug 13 is threadably engaged at the closed opposite end of housing 11 and is provided to permit fluid to be readily added or removed from the shock abosrber.

The fluid that is used in the practice of this invention is disposed in chamber 36 formed by the walls of housing 11. Generally, a compressible liquid, such as silicones or alcohols, are used as the fluid medium in this invention because, in a sense, they behave very much like gases and thus contribute to the unique fluid amplification characteristics of this invention.

The term "fluid amplification" as used herein designates a unique method of permitting fluid to flow through a fixed orifice in a shock absorber. Fluid which flows under fluid amplification behaves in a manner such that the effective flow area of the orifice through which the fluid passes varies directly with the fluid flow velocity. This reduction in effective flow area occurs as a result of varying turbulence and boundary layers that are formed in the orifice as fluid velocity through the orifice changes. Thus, for example, whereas a conventional fixed orifice will exhibit an increased fluid pressure drop in proportion to fluid velocity to the second power, e.g., squared, an orifice in which "fluid amplification" occurs will exhibit a pressure drop increase in proportion to fluid velocity to some lesser power, e.g., 0 to 2. Accordingly, when fluid amplification occurs in shock absorbers, almost square force-displacement curves can be achieved without the need for complex metering tubes, metering pins, pressure responsive valves and the like.

As shown in FIG. 1, therefore, piston assembly 20 includes a piston rod 29 which is designed to reciprocate in housing 11, and an enlarged dashpot or piston head 50 secured to rod 29 by means of flared upset end 21. Head 50 is provided with two separate DeLaval nozzle shaped openings 60 disposed on opposite sides of rod 29. The DeLaval nozzle openings 60 are essentially converging-diverging nozzles and are oriented in head 50 such that the converging cross-section 61 and throat 62 are forwardly disposed on head 50 relative to the diverging cross-section 63. A deflector shield or plate 23 is also secured to head 50 immediately adjacent the rearwardly disposed diverging cross-section 63. Deflector shield 23 is provided to prevent fluid exiting from the nozzle exit passage 63 from impinging directly on end cap 15. Instead, as fluid passes through passage 63, it is deflected in the direction of housing walls 11 where heat generated by the rapidly flowing fluid is dissipated through walls 11 and to the atmosphere.

A coating of "Teflon" polymer or other polymeric or non-polymeric low-friction material is applied to the transverse area 59 of dashpot head 50 to reduce the friction between head 50 and housing walls 26. Upon assembly of the shock absorber of this invention end cap 15 is threadably engaged to housing 11 as shown at threads 28. Wrench holes 43 used for accommodating a wrench are provided on the cap 15 to permit the cap to be easily inserted and removed from housing 11.

As shown in FIGS. 3-6, when the shock absorber is in compression (FIG. 5), fluid contained in chamber 36 first passes through converging lip 61 at the nozzle entrance, into the narrow throat section 62 where it is accelerated and then into the diverging exit cross-section 63 where it can be even further accelerated, depending on velocity across the throat section 62. After passing through the expanded diverging cross-section 63 of the nozzle, the fluid is deflected by plate 23 in the direction of the inner walls 26 of housing 11. Upon the return or extension stroke of the shock absorber, fluid first passes around deflector plate 23, around the angled front edge 24 of the deflector, through the diverging cross-section 63 and throat section 62 of the nozzle, and then back through section 61 and into chamber 36.

It has been observed in the practice of this invention that the use of DeLaval nozzle type openings 60 in piston head 50 in place of traditional orifices offer a host of advantages. For example, under normal conditions, nozzles 60 act in the same manner that orifices would, permitting fluid amplification in the shock absorber when fluid velocities through the nozzles are maintained at levels below sonic velocities. However, as sonic fluid velocities are approached (and unlike the conventional orifice type openings where fluid turbulence in the shock absorber actually limits fluid flow through the orifices), nozzles 60 are designed to further accelerate the fluid in the diverging cross-section 63 to supersonic velocities without any resultant turbulence or fluid flow restriction.

Unlike other ways of obtaining amplified fluid flow, a DeLaval nozzle has the unique ability to scavenge its own flow as fluid velocity across the nozzle throat exceeds about Mach 0.6. As fluid velocity approaches the sonic velocity range, a boundary layer is formed in the DeLaval nozzle which, in turn, reduces the effective flow area through the nozzle. At impact, fluid velocities through the orifice exceed Mach 0.6; but as the shock absorber and fluid velocities slow, the self-scavenging reaction ceases and the effective orifice area is decreased. Thus, the unique DeLaval type nozzle openings used in the shock absorbers of this invention act as variable orifices. At low fluid velocities, the opening tends to become restricted and less fluid flows through the opening than would be expected.

The result of this phenomena is shown graphically in FIG. 2 where shock curves are shown for a spring type shock absorber at C, a stright fixed orifice type shock absorber at A and the unique shock absorber of this invention at B. Unlike either the spring or fixed orifice type shock absorbers, the shock absorber of this invention with the DeLaval openings has a relatively square shock curve which indicates, of course, that a relatively constant shock force is generated in the orifice even though fluid velocity is decreasing.

Again as mentioned above, at high impact velocities, fluid flow through the openings is accelerated above that normally expected by means of diverging section 63. This scavenges the fluid flow and allows an increased amount of fluid to flow through the shock absorber. At reduced velocities, however, the scavenging effect ends and the effective orifice area decreases, allowing the shock absorber to maintain a relatively constant shock force even though fluid velocity is decreased.

In FIG. 7 a modified form of the shock absorber of this invention is shown. This embodiment is an adaptation of the present invention using DeLaval nozzle shaped fluid passages in the construction shown in FIG. 5 of Taylor U.S. Pat. No. 3,726,368. In this embodiment, an inner shock tube 16 is disposed within housing 101. A series of air-reservoir tubes 6 are disposed in part of the annular area formed between the shock tube 16 and outer housing 101. The outer housing 101 is crimped slightly as shown at 17. Piston rod 200 and head 205 are the same as in FIG. 1. Head 205 contains a plurality of DeLaval nozzle openings 60 spaced on opposite sides of rod 200. A shock absorber rebound compliance bushing 204 and bushing cover 203 are disposed inside the inner shock tube 16 to accommodate piston head 205 on rebound, as the return stroke of the piston takes place.

Outside the absorber and attached to rod 200 are mounting plate 201 and compliance bushing 202. As is the case with the shock absorber shown in FIG. 1, a seal gland 300 is employed to seal housing walls 101, inner shock tube 16 and piston rod 200.

On the compression stroke, compressible liquid contained in chamber 136, passes through DeLaval nozzles 60 and at the same time part of the liquid passes through orifice opening 206 into annular area 137. Liquid contained in the annular area 137, in turn, passes through metering orifice 100, in the wall 18, and around air-reservoir tubes 6. On the return or rebound stroke liquid passes back into chamber 136.

In FIGS. 8 and 9, angled DeLaval nozzle type openings are shown which do not require the use of deflector shields to deflect fluid in the direction of the housing walls. Flow direction is shown as 160 and 260, respectively. In the nozzle shown, in FIG. 8, fluid flows through the converging entrance section 161, through throat 162 and exits through inclined diverging section 163. In the nozzle shown in FIG. 9, converging section 261 and throat section 262 are horizontally disposed and only diverging section 263 is inclined in the direction of the outer cylinder housing walls. In either nozzle, however, fluid flowing through the nozzle is directed toward the outer housing walls, where heat generated by the rapidly flowing fluids can be readily dissipated.

In FIG. 10, the DeLaval nozzle shaped openings have a pivoted exit valve 25 which remains open as fluid flows in direction 360, through entrance 361, throat 362 and exit 363, but closes as fluid flows in an opposite direction during the return stroke of the shock absorber piston. This tendency of valve 25 to close upon the return stroke of the piston is yet another way to cause a reduction in the effective flow area of the opening.

Finally, in FIG. 11, a sealing ring 352 is shown disposed about the transverse surface 351 of piston or dashpot head 350. This ring serves to tightly seal the transverse surface 351 of the dashpot head to insure that all fluid flows through nozzles 353 rather than through any space formed between head 350 and wall 311.

It should be understood that although a number or variations and modifications of the embodiments discussed herein may occur to those skilled in the art, such embodiments are intended to fall within the spirit and scope of this invention as defined in the appended claims.

I claim:

1. A shock absorber comprising:
    a housing means charged with a compressible fluid;
    sweeping means slidably disposed within said housing for traversing said housing means, said sweeping means separating said housing means into at least two chambers; and
    at least one DeLaval nozzle-shaped fluid passage disposed in said sweeping means and providing the exclusive means for the flow of fluid between said separated chambers formed in said housing means, said passage being configured to accommodate the flow of said compressible fluid at velocities approaching Mach 0.6 and greater and to produce a relatively constant resistance force with increasing fluid velocity therethrough, whereby the flow of said fluid through said passage at said velocities provides fluid amplification upon movement of said sweeping means.

2. The shock absorber of claim 1 including a plurality of DeLaval nozzle-shaped fluid passages arranged symmetrically about the central axis of said sweeping means.

3. The shock absorber of claim 2 wherein said housing means is a cylinder and said sweeping means is a piston head which reciprocates within said cylinder and is driven by means of a piston rod.

4. The shock absorber of claim 3 wherein:
    a. said piston head has a forward transverse sweeping surface and a rear transverse surface opposite said forward transverse sweeping surface, said forward and rear transverse surfaces separating said cylinder into two chambers; and
    b. a deflection plate circumferentially disposed on the rear transverse surface of said piston head, said deflection plate extending outwardly from said fluid passages to deflect fluid passing through said passages.

5. The shock absorber of claim 2 wherein said plurality of DeLaval nozzle-shaped fluid passages are disposed in a parallel relationship with respect to the axis of movement for said sweeping means.

6. The shock absorber of claim 2 wherein said plurality of DeLaval nozzle-shaped fluid passages are in non-aligned relationship with respect to the axis of movement for said sweeping means.

* * * * *